Feb. 20, 1962　　　M. GLAS　　　3,021,802
HYDRAULIC PRESS

Filed March 8, 1957　　　10 Sheets-Sheet 1

INVENTOR.
Maurus Glas
BY Ernest G Montague
Attorney

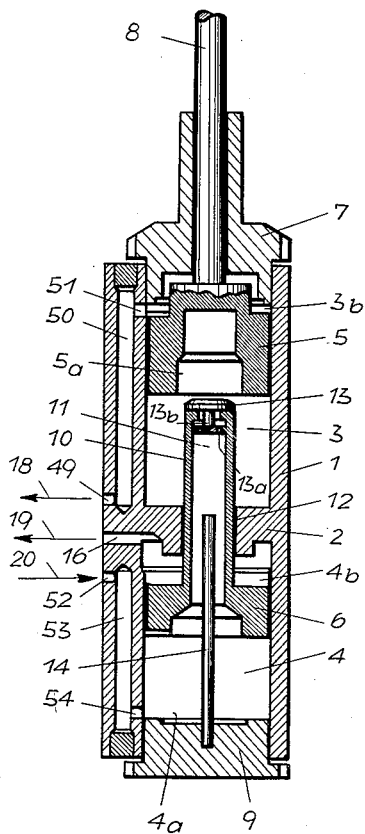
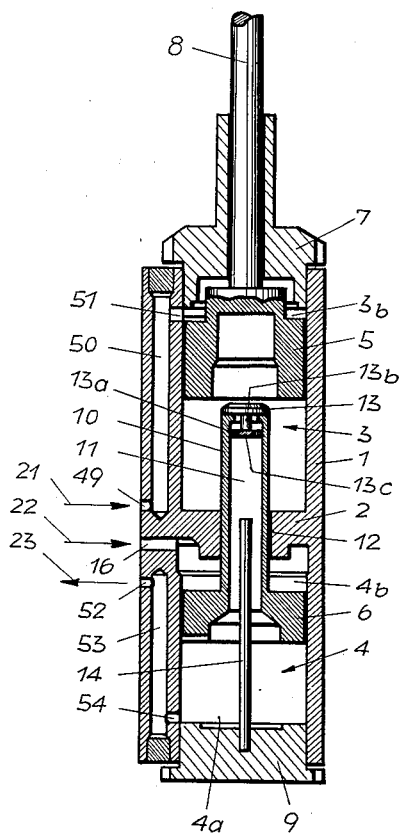

Feb. 20, 1962 M. GLAS 3,021,802
HYDRAULIC PRESS
Filed March 8, 1957 10 Sheets-Sheet 3

INVENTOR.
Maurus Glas
BY Ernest Montague
Attorney

Feb. 20, 1962 M. GLAS 3,021,802
HYDRAULIC PRESS
Filed March 8, 1957 10 Sheets-Sheet 4

INVENTOR.
Maurus Glas
BY Ernest Montague
Attorney

Feb. 20, 1962 M. GLAS 3,021,802
HYDRAULIC PRESS
Filed March 8, 1957 10 Sheets-Sheet 5

INVENTOR.
Marius Glas
BY
Ernest F. Montague
Attorney

Feb. 20, 1962    M. GLAS    3,021,802
HYDRAULIC PRESS
Filed March 8, 1957    10 Sheets-Sheet 6

INVENTOR.
Maurus Glas
BY Ernest F. Montague
Attorney

Feb. 20, 1962 M. GLAS 3,021,802
HYDRAULIC PRESS
Filed March 8, 1957 10 Sheets-Sheet 7

INVENTOR.
Maurus Glas
BY Ernest F. Montague
Attorney

Feb. 20, 1962 M. GLAS 3,021,802
HYDRAULIC PRESS
Filed March 8, 1957 10 Sheets-Sheet 8

INVENTOR.
Maurus Glas
BY
Attorney

Feb. 20, 1962 M. GLAS 3,021,802
HYDRAULIC PRESS
Filed March 8, 1957 10 Sheets-Sheet 9

INVENTOR.
Maurus Glas
BY
Ernest F. Montague
Attorney

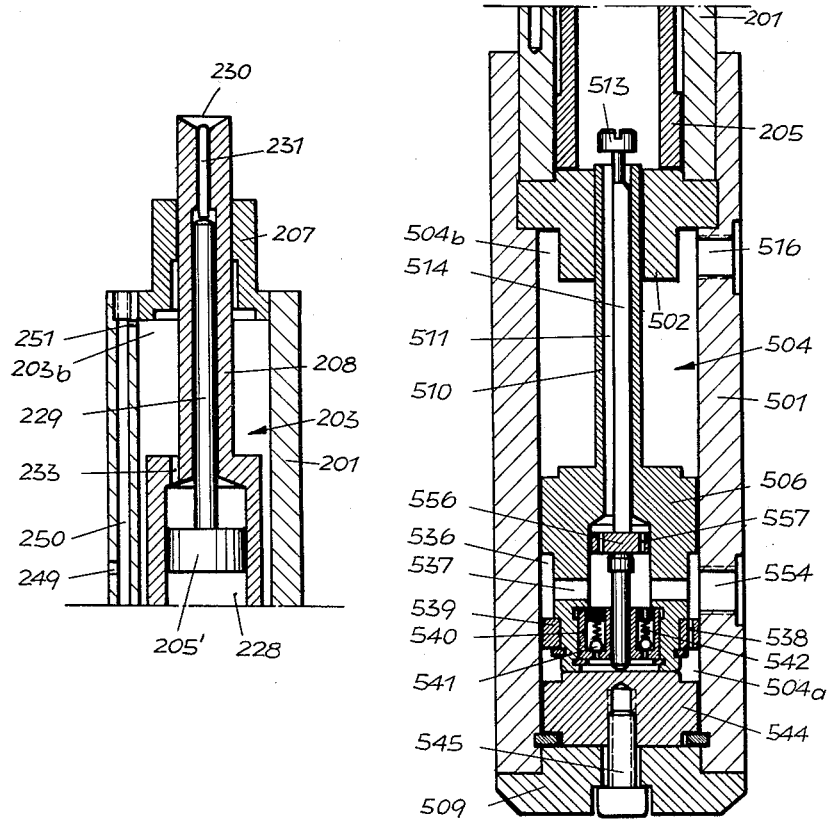

United States Patent Office 3,021,802
Patented Feb. 20, 1962

3,021,802
HYDRAULIC PRESS
Maurus Glas, Jordanstrasse 10, Frankfurt am
Main, Germany
Filed Mar. 8, 1957, Ser. No. 644,758
Claims priority, application Germany Mar. 13, 1956
11 Claims. (Cl. 113—45)

The present invention relates to a hydraulic press, adapted for instance for riveting, stamping, or the like, with two coaxially disposed and successively operative pistons, which operate as a ram and as a set-off piston, respectively, in cylindrical chambers separated from each other and in which the stepped up piston formed as a set-off piston may enter the cylindrical chamber of the ram with that portion having lesser diameter.

The known hydraulic presses of this type have cylinder parts which are screwed together in such manner that cylinder zones are created which correspond with these parts. This arrangement leads to a structure in which the pistons do not run along smooth walls, but on divided wall which practically cannot be worked precisely in relation to the bore, that friction and wear can be avoided. In addition the drawback is brought about that the sealing of the engaging cylinder faces must be provided, which requires special measures. It is impossible to provide in such cylinder arrangement all required channels in the cylinder walls for feeding the pressure fluid.

It is, therefore, one object of the present invention to provide a hydraulic press, which preferably performs the feed with great speed and a short power stroke and which avoids the drawbacks of the known presses and also improves the working of the set-off piston; which, furthermore, simplifies the manufacture and storage thereof and which makes possible a particularly advantageous development to a stamping device.

It is another object of the present invention to provide a hydraulic press wherein the cylindrical chambers of the two pistons are disposed in a cylindrical body, in the wall of which the channels for the pressure fluid are arranged, and wherein the cylindrical chambers are separated by a dividing wall having an opening through which the portion of lower diameter of the set-off piston projects and an axial boring in the set-off piston is equipped with a valve, which is opened in one end position of the set-off piston by means of a ram disposed between the valve seat and the cylinder cover.

The cylindrical body is made either integrally as one piece or the joint of two parts of the cylindrical body is arranged in such manner, that the split is covered on its inside by a dividing wall separating the two cylindrical chambers.

In order to permit of use of the same model for a pressure press and also as a drawing press and in order to require slight variations only for the two presses, an arrangement is provided advantageously in which the ram, having a hollow cylindrical portion, is equipped with bores which have parallel axes and which do not project therethrough, said bores communicating with the chamber defined by the hollow cylindrical portion of the ram. The bores are open on one or the other side of the cylinder in order to design the piston as a pressure piston or as a drawing piston. The hydraulic press may be designed, however, in such manner that a double ram is provided one part of which creates a clamping effect while the other part brings about the working pressure. This end is achieved by subdividing the ram into two part pistons centrally disposed relatively to each other, one part of which exerts pressure upon a pressure die and the other exerts pressure upon a pressure sleeve surrounding the die.

If a great clamping effect and a small working pressure is to be achieved, the inner part piston is rigidly secured to the pressure die and the outer part piston is rigidly secured to the pressure sleeve. If, however, a small clamping effect, but a large working pressure is to be achieved, the outer part piston is rigidly secured to the pressure die, while the inner part piston works on the pressure sleeve by means of rams which are guided in the outer part piston along parallel axes.

Hydraulic presses designed in this manner bring about a simple, handy and safe hydraulic unit, which may be built into different working machines either as a singular or as a multiple arrangement, as for instance a gauged part, or which may be also designed as a manually operated tool.

It is still another object of the present invention to improve still further such hydraulic press in the following manner:

If the set-off piston is set for the working stroke, a very small resistance is encountered during the advancement of the piston, because the cylinder chambers which receive the piston are connected with the outlet for the pressure medium. This little resistance causes a certain part of the stroke of the set-off piston during the filling of the cylindrical chamber of the set-off piston, which chamber is to be filled during the advancement of the piston, prior to the closing of the valve which closes the bore of the set-off piston. This part of the piston stroke is lost. In order to remove this drawback, the hydraulic press is designed in such manner, that in a first phase the axially disposed bore of the set-off piston, in a second phase, which overlaps partly said first phase, the cylindrical chamber to be put under pressure during the advancing stroke of the piston is slowly filled and in a third phase this cylindrical chamber is rapidly filled with the pressure medium.

In order to bring about this result, the hydraulic press may be designed in such manner, that the feed of the pressure medium is directed towards an annular piston disposed at the periphery of the set-off piston. The annular piston is in communication with the axially disposed bore of the set-off piston by means of radial bores and with the cylindrical chamber of the set-off piston to be put under pressure during the advancing stroke of the set-off piston by means of at least one small bore disposed parallel to the longitudinal axis of the piston. The mentioned cylindrical chamber is in communication with the bore projecting through the set-off piston by means of at least one relief valve disposed in the set-off piston and operative against the pressure exerted from the cylindrical chamber.

In order to permit of the change of the speed of the operation of the set-off piston by different means, a closing piston, which is adjustable in axial direction, is disposed in the cylindrical chamber to be set under pressure during the advancing stroke of the set-off piston and in particular between the latter and the cylinder cover.

If a plurality of hydraulic presses is provided, it is advisable, in accordance with the present invention, to connect the presses, which are fed by a common conduit with a connecting conduit which terminates in each of the presses in the cylindrical chamber to be set under pressure during the advancing stroke of the set-off piston.

The hydraulic press may be designed also as a stamping tool, wherein workpiece parts are stripped off by a sleeve, which workpiece parts are caught at about the end face of the piston rod of the working ram during the return stroke of the working ram, the mentioned sleeve serving as means for pressing together of the workpiece parts to be stamped during the advancing stroke of the piston.

It is, therefore, still a further object of the present invention to provide a hydraulic press which is designed in such manner that a sleeve-like third piston is coaxially disposed and movable relative to the piston rod of the working ram in a third cylindrical chamber separated from the cylindrical chamber of the working ram by a dividing wall, the pressure side of the third piston of the third cylindrical chamber being in communication with the pressure medium conduit for the working ram; and that a sleeve is provided in the cylindrical body outside of the cylindrical chamber for the third piston which sleeve surrounds the piston rod of the working ram formed at its end face as stamping tool and is movable on the piston rod and which sleeve is connected with the third piston, and that a coupling means is provided on the piston rod of the working ram, the end face of said piston rod running at first behind the end face of the sleeve during the advancing stroke, which coupling means may slide within the sleeve during the advancing stroke of the piston rod, however, couples with the third piston during the return stroke of the piston rod.

It is to be understood that different variations of the hydraulic press are possible by forming, for instance, the set-off piston in accordance with one embodiment and the working ram in accordance with another embodiment.

With these and other objects in view which will become apparent in the following detailed description, the present invention will be clearly understood in connection with the accompanying drawings, in which:

FIGURES 1 to 6 are axial sections of a first embodiment of the hydraulic press, indicating different phases of its operation;

FIG. 9 demonstrating the embodiment for a great clamping effect and low working pressure and FIG. 10 demonstrating the embodiment for a small clamping effect and a high working pressure;

Figure 9:
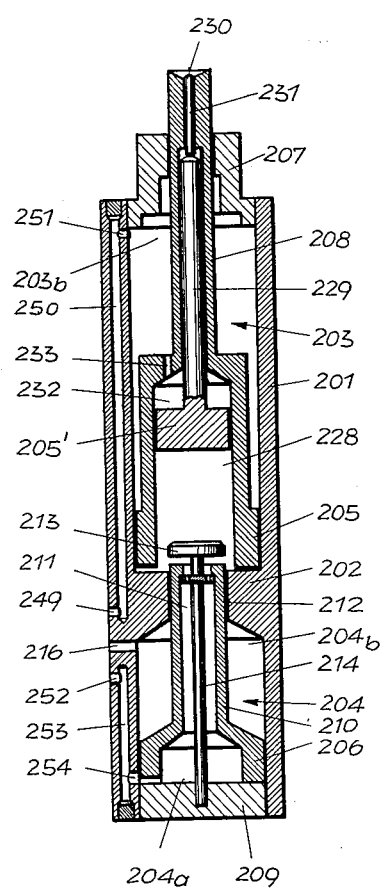
FIG. 9 and 10 are axial sections of a third embodiment of the hydraulic press disclosing a divided working ram, one part performing a clamping effect and the other part creating the working pressure.
Figure 11:
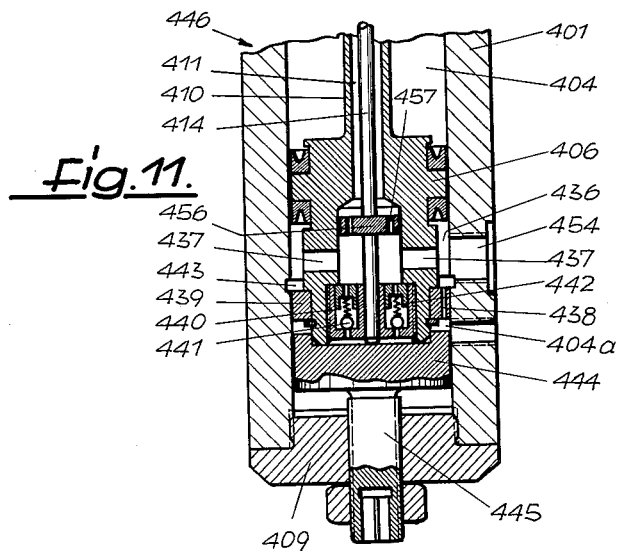
FIG. 11 is a fragmentary axial section of a fourth embodiment of the hydraulic press with improved admission conditions in the set-off piston.
Figure 13A:
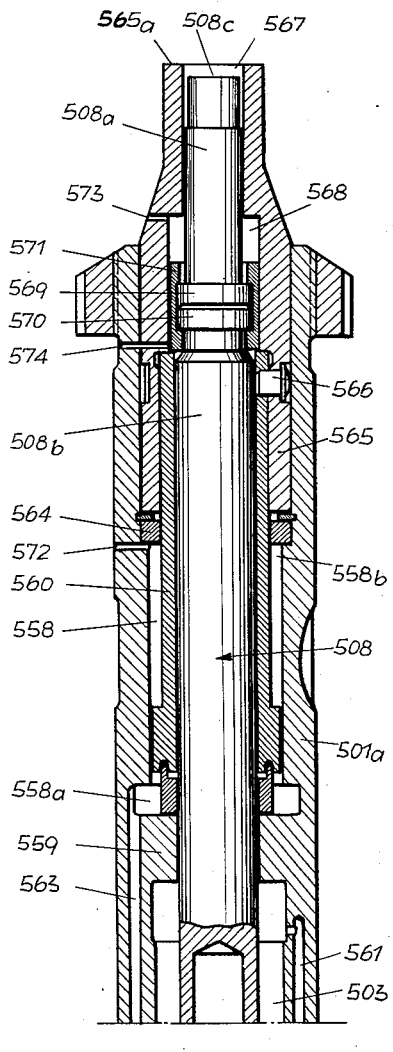
FIGS. 13a and 13b are complementary axial sections of still another embodiment of the hydraulic press in its application as a stamping tool.
Figure 13B:
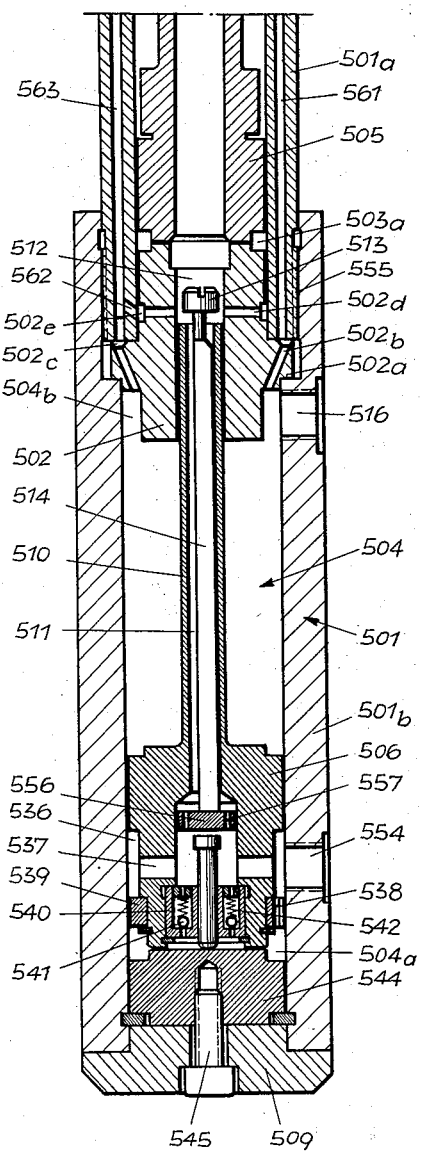
Figure 13C:
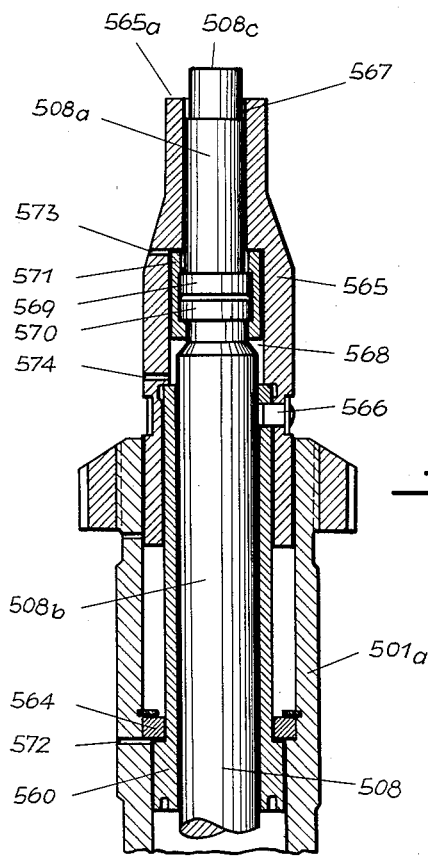
FIG. 13c is a fragmentary axial section of the hydraulic press shown in FIGS. 13a and 13b, however, the tool shown in a different operative position.
Figure 14A:
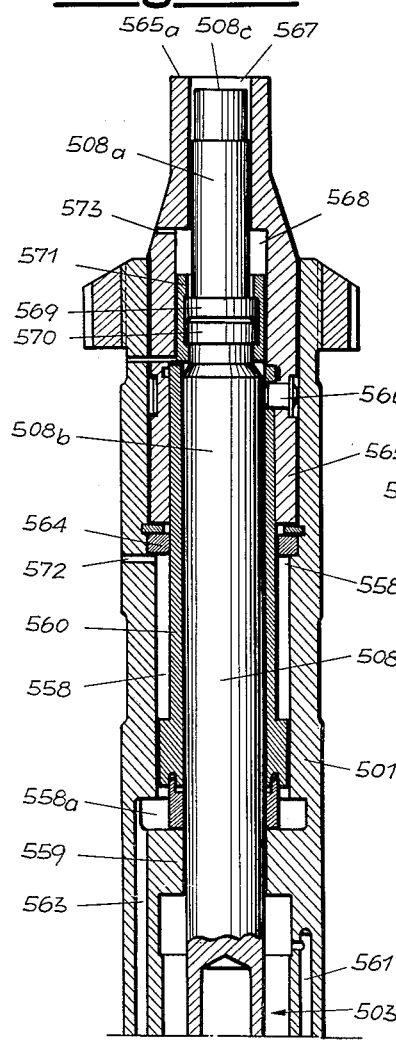
Figure 14B:
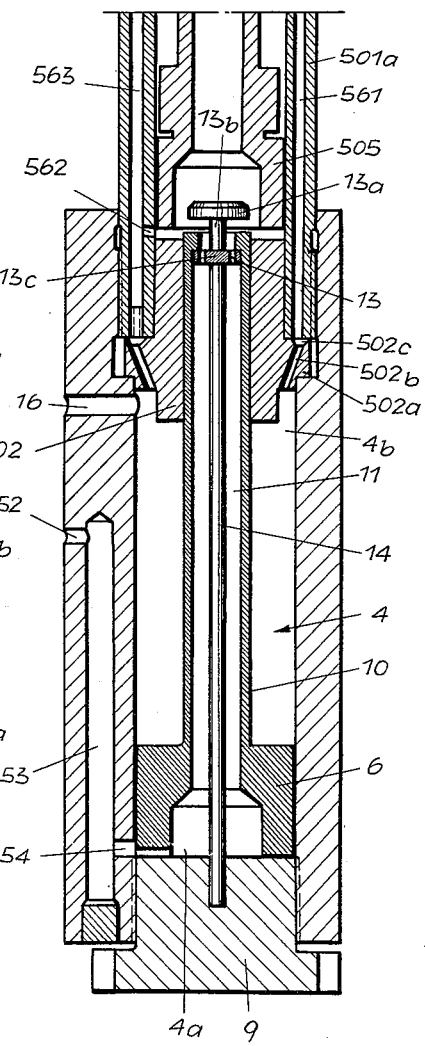

FIGS. 14a and 14b are complementary axial sections of a further embodiment of the hydraulic press, wherein the set-off piston of the embodiment shown in FIGS. 1 to 6 and the working ram shown in FIG. 13 are used; and FIGS. 15a and 15b are complementary axial sections of another embodiment of the hydraulic press, wherein the set-off piston shown in FIG. 11 and the working ram shown in FIG. 9 are used.

Referring now to the drawings, and in particular to FIGS. 1 to 6, the hydraulic press comprises an integral cylinder block 1 which is divided by a dividing wall 2 into two cylindrical chambers 3 and 4. The working ram 5 reciprocates in the cylindrical chamber 3 and the set-off piston 6 reciprocates in the cylindrical chamber 4. The cylindrical chamber 3 is closed up by a cover 7 in which the piston rod 8 of the working ram 5 finds its guide. The cylindrical chamber 4 is closed up by the cover 9. The set-off piston 6 has a hollow piston rod 10 and both the set-off piston 6 and the piston rod 10 define a bore 11. The hollow piston rod 10 finds its guide in a bore 12 of the dividing wall 2. The hollow piston rod 10 of the set-off piston 6 is open at its top and may be closed up in the cylindrical chamber 3 by means of a valve member 13 which is equipped with a guide comprising a disc 13c reciprocating in the bore 11 of the piston rod 10 and which is equipped with holes 13a and also rigidly connected with the valve member 13 by means of a bolt 13b. The valve member 13 is lifted, in the original position of the set-off piston 6, from the hollow cylindrical piston rod 10 of the set-off piston 6 by means of a ram 14, which in the embodiment shown in FIGS. 1 to 6 of the drawing is secured to the cover 9 of the chamber 4. The working ram 5 has a recess 5a open towards the chamber portion 3a of the chamber 3, which chamber portion 3a is to be filled with the pressure medium during the advancing stroke of the working ram 5, and the valve member 13 may project into the recess 5a of the working ram 5.

The connections for the conduits feeding the pressure medium, which conduits may be arranged in conventional manner and may, therefore, operate simultaneously as feeding and exhaust conduits, are concentrated in the center of the cylinder block 1. There are provided the connection bore 49 adapted for feeding the pressure medium into the chamber portion 3b of the chamber 3 during the return stroke of the working ram 5 and for the exhaust of the same during the advancing stroke of the working ram 5, the connection bore 16 for the feeding into the chamber portion 4b of the chamber 4 during the return stroke of the set-off piston 6 and for the exhaust of the same during the advancing stroke of the set-off piston 6, the connection bore 52 for the feeding into the chamber portion 4a of the chamber 4 during the advancing stroke of the set-off piston 6 and for the exhaust of the same during the return stroke of the set-off piston 6.

The connection bores 49 and 52 for the outer chamber portions 3b and 4a are connected with their coordinated chamber portions by means of conduits 50 and 53, respectively, which are provided at the periphery of the cylinder block 1 and lead into these coordinated chamber portions by means of bores 51 and 54, respectively. It is to be understood that piston rings and sealing rings are provided also in conventional manner wherever required.

Figure 1:
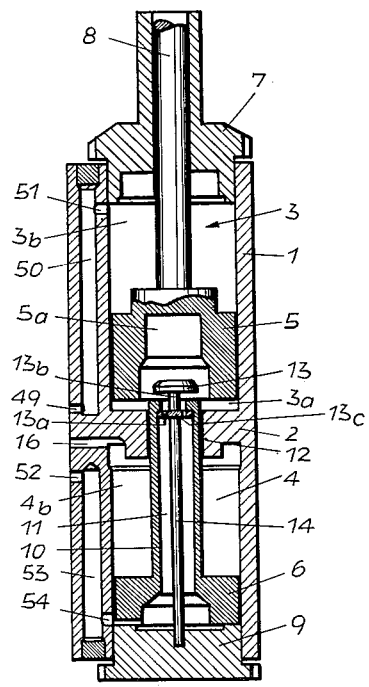
Figure 2:
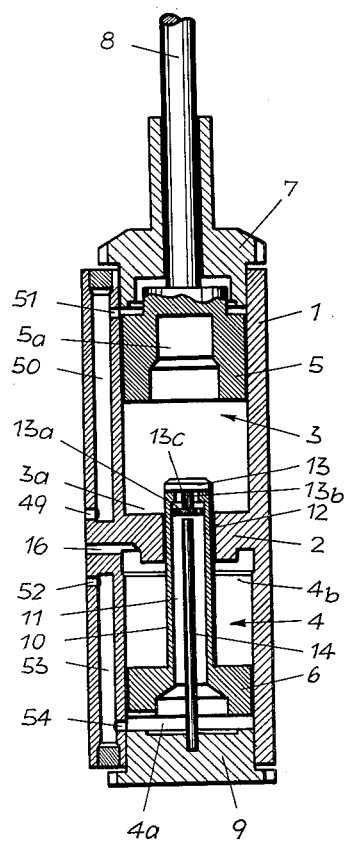
Figure 5:
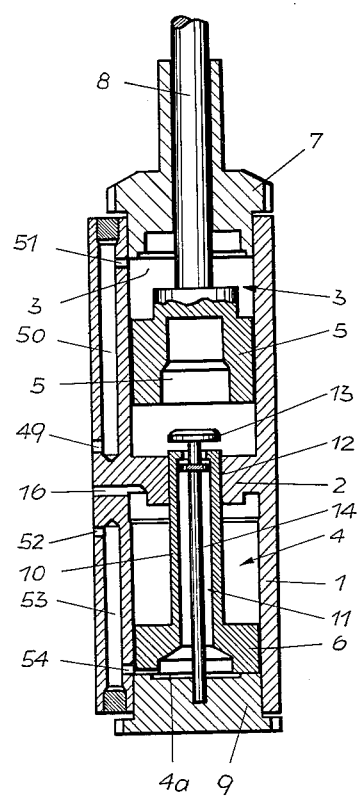
Figure 6:
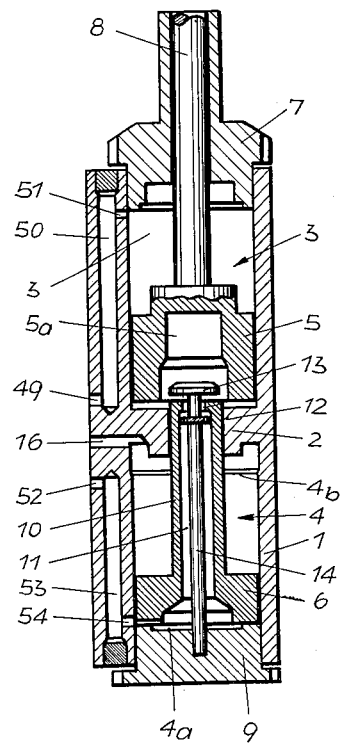

The hydraulic press disclosed in FIGS. 1 to 6 operates in the following manner:

During the advancing stroke of the working ram 5 and the set-off piston 6, the pressure medium is fed through the connection bore 52 (see arrow 20, FIG. 3), the conduit 53 and the connection bore 54 into the chamber portion 4a of the chamber 4 to be filled during the advancing stroke of the set-off piston 6. The pressure medium will follow the line of least resistance and, therefore, will flow through the bore 11 of the set-off piston 6 and its piston rod 10 passing the valve member 13 which has been opened by means of the ram 14 into the chamber portion 3a of the chamber 3 to be filled during the advancing stroke of the working ram 5 (FIG. 1) and moves the latter to a point in which a die (not shown) secured to the free end of the piston rod 8 engages a workpiece. During this movement of the working ram 5 the set-off piston 6 will follow and the valve member 13 will close the open end of the hollow piston rod 10, so that the pressure medium enters only the chamber portion 4a and the hollow piston rod 10 (FIG. 2). The set-off piston 6 moves now with the hollow piston rod 10, the bore of which has been closed up by the valve member 13, and is forced in accordance with the cross sections of the set-off piston 6 and the valve member 13 into the chamber portion 3a of the chamber 3 and, thereby, exerts the required pressure upon the working ram 5 (FIG. 3). During the advancing stroke of the working ram 5 and of the set-off piston 6 the pressure memedium is exhausted through the connection bores 49 and 16 (see arrows 18 and 19 in FIG. 3).

Upon reversing the hydraulic press, which may be brought about by manual operation, by foot operation or by electrically operated means, after termination of the working stroke the pressure medium is fed through the connection bores 49 and 16 (see the arrows 21 and 22 in FIG. 4), while the pressure medium may be exhausted through the connection bore 52 (see the arrow 23 in FIG. 4). The pressure medium flows again following the line of least resistance at first through the connection bore 16 into the chamber 4b of the chamber 4 of the set-off piston 6 and brings about its return stroke, whereby the pressure medium contained in the chamber portion 4a escapes through the connection bore 52. The pressure medium fed into the chamber portion 3b through the connection bore 49 returns the working ram 5 to its original position. The return stroke of the set-off piston 6 is achieved by feeding the pressure medium through the connection bore 16 until the valve member 13 is lifted by the ram 14 to assume again the position shown in FIG. 5. In this position the pressure medium which is present in the chamber portion 3a may escape through the bore 11 of the hollow piston rod 10 of the set-off piston 6 into the chamber portion 4a and from here through the connection bore 52 (FIG. 6), so that the working ram 5 and the set-off piston 6 are returned again to their original positions shown in FIG. 1. Now the hydraulic press can be switched again for the next working cycle.

It is to be understood that a fast working stroke of the working ram 5 and, thereby, a fast engagement of the stamping die with the workpiece may be achieved by changes in the pressure of the pressure medium and that it is possible to operate thereafter with continuously increasing pressure which may be controlled in known manner by an adjustable over pressure valve. It is a particular feature of the hydraulic press disclosed in FIGS. 7 and 8 of the drawings that the pressure type (FIG. 7) and the drawing type (FIG. 8) are distinguished very slightly over each other and in particular merely by a proper predetermined arrangement of the connection bores. This brings about the very important advantage that a single embodiment may be used selectively for hydraulic presses of the pressure type and of the drawing type and may be held in stock and the adjustment for a pressure type or a drawing type of the hydraulic press may be made thereafter at will.

Figure 7:
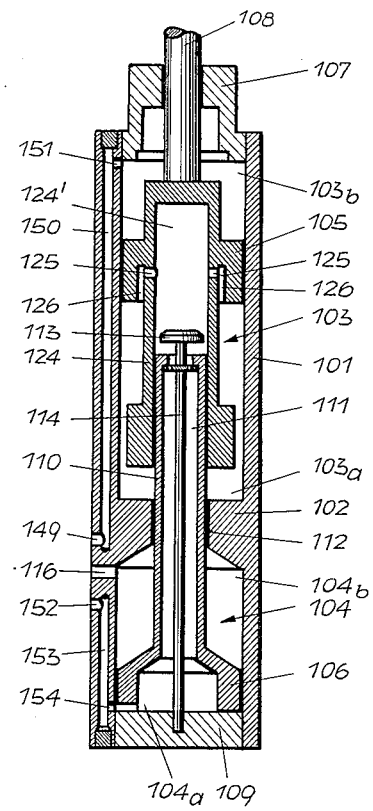
FIGS. 7 and 8 are axial sections of another embodiment of the hydraulic press, indicating slight distinctions in the application for a pressure press, as shown in FIG. 7 and in the application for a drawing press, as shown in FIG. 8.
Figure 8:
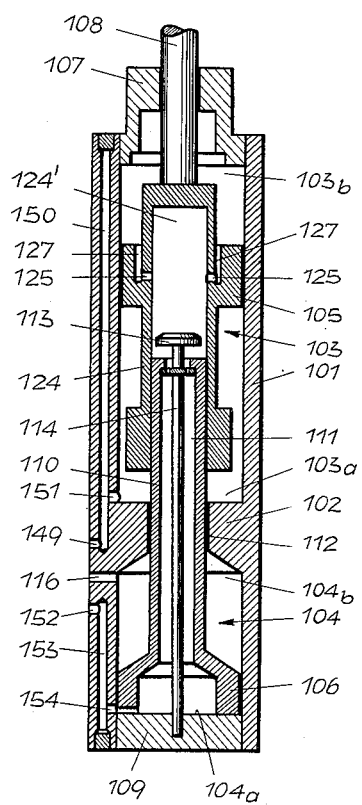

The structure of the hydraulic press disclosed in FIGS. 7 and 8 is identical in principle with the embodiment disclosed in FIGS. 1 to 6. Thus, the embodiment disclosed in FIGS. 7 and 8 comprises an integral cylinder block 101, a dividing wall 102 for dividing the cylinder block 101 into the chambers 103 and 104, the chamber 103 defining again the chamber portions 103a and 103b and the chamber 104 defining the chamber portions 104a and 104b, a working ram 105, a set-off piston 106, the chambers 103 and 104 being closed up by the covers 107 and 109, respectively, a piston rod 108 secured to the working ram 105, a hollow piston rod 110 having a bore 111 and being connected with the set-off piston 106, the dividing wall 102 having a bore 112, the valve member 113, the ram 114 secured to the cover 109 of the chamber 104, the connection bores 149, 116 and 152, the conduits 150 and 153 and the openings 151 and 154 in the cylinder block 101, which elements correspond with those described in connection with the embodiment shown in FIGS. 1 to 6.

In this embodiment (FIGS. 7 and 8) the hollow piston rod 110 is guided in a hollow cylinder portion 124 of the working ram 105 and the inner chamber 124' defined in this hollow cylinder portion 124 is connected with the chamber portion 103a in the pressure type of the hydraulic press (FIG. 7), however, with the chamber portion 103b in the drawing type of the hydraulic press (FIG. 8). The hollow cylinder portion 124 is equipped with radial bores 125 which are in communication with the chamber portion 103a in the embodiment according to FIG. 7 by means of a cylindrical channel 126 disposed parallel to the longitudinal axis of the working ram 105 and with the chamber portion 103b by means of a cylindrical channel 127 disposed parallel to the longitudinal axis of the working ram 105.

The embodiment disclosed in FIG. 7 operates in the same manner as the embodiment disclosed in FIGS. 1 to 6. In the embodiment disclosed in FIG. 8, however, during the forward stroke of the working ram 105 and of the piston 106, the pressure medium flows through the connection bore 152, the conduit 153 and the opening 154 into the chamber 104a to be filled of the set-off piston 106. The pressure medium seeks the path of least resistance and thus flows through the bore 111 of the set-off piston 106, 110 passing the valve member 113, which has been opened by means of the ram 114, into the chamber 124' of the working ram 105 and from there through the radial bores 125 and the cylindrical channel 127 into the chamber 103b, thus moves the working ram 105 in a direction opposite to the direction of the forward stroke of the set-off piston 106, so that no pressure is exerted, as in the embodiment shown in FIG. 7 (in the drawing upwardly), but a pull (in the drawing downwardly). The pressure medium which is present in the chamber portion 103a is then removed through the opening 151, the conduit 150 and the connection bore 149.

During this stroke of the working ram 105 the set-off piston 106 advances and, thereby, the valve member 113 closes the bore 111 of the hollow piston rod 110, so that the pressure medium can now flow only into the chamber portion 104a. The set-off piston 106 advances now fortified by the piston rod 110, which is now closed by the valve member 113, in accordance with the cross sections of the set-off piston 106 of the valve member 113 into the chamber portion 124' of the working ram 105 and through the openings 125 and the cylindrical channel 127 into the chamber portion 103b and exerts, thereby, the required pressure upon the working ram 105 in such direction that a pull (in the drawing downwardly) is brought about on the piston rod 108. During the forward stroke of the set-off piston 106 the pressure medium present in the chamber portion 104b is removed through the connection bore 116. The return stroke, in which case the connection bores 116 and 149 are connected with the pressure conduit and the connection bore 152 with the release conduit, takes place by moving the set-off piston 106 and the working ram 105 in opposite directions.

The embodiment disclosed in FIG. 9 is identical in principle with the embodiment disclosed in FIGS. 1 to 6. The structure, therefore, comprises again a cylinder block 201, the working ram 205, the set-off piston 206, the dividing wall 202 separating the chambers 203 and 204, which chambers are closed up by the covers 207 and 209, respectively, as well as the valve member 213 operated by the ram 214 and also the connection bores 249, 216 and 252, as well as the conduits 250 and 253 leading to the bores 251 and 254, respectively.

The distinctions in the embodiment shown in FIG. 9 over that shown in FIGS. 1 to 6, reside, however, in an arrangement provided for in FIG. 9, according to which the working ram 205 has a second dividing wall and is formed as a cylinder which receives in the chamber 228, defined by said cylinder, a second piston 205', the piston rod 229 which is guided in the hollow piston rod 208 of the working ram 205. The arrangement may be made, for instance in such manner that the end face 230 of the piston rod 208 of the working ram 205 is formed as a pressure die for pressing together two sheets of a workpiece to be riveted together and that the piston rod 229 of the working ram 205' operates on a riveting stem disposed in the end of the bore of the piston rod 208 and axially movable therein. The chamber portion 232 of the chamber 228 defined in the working ram 205 is connected with the chamber portion 203b by at least one bore 233, so that the pressure medium may be shifted from the chamber portion 232 into the chamber portion 203b during the advancing stroke of the working ram 205' and during the return stroke of the working ram 205' may enter the chamber portion 232. In this embodiment the clamping pressure exerted by the end face 230 of the piston rod 208 is greater than the clinching pressure exerted by the riveting stem 231. The working operation is in principle the same as that described in connection with the embodiment disclosed in FIGS. 1 to 6. Due to the subdivision of the working ram its outer ram portion 205 is moved first during the advancing stroke and the working ram portion 205' follows later.

Figure 10:
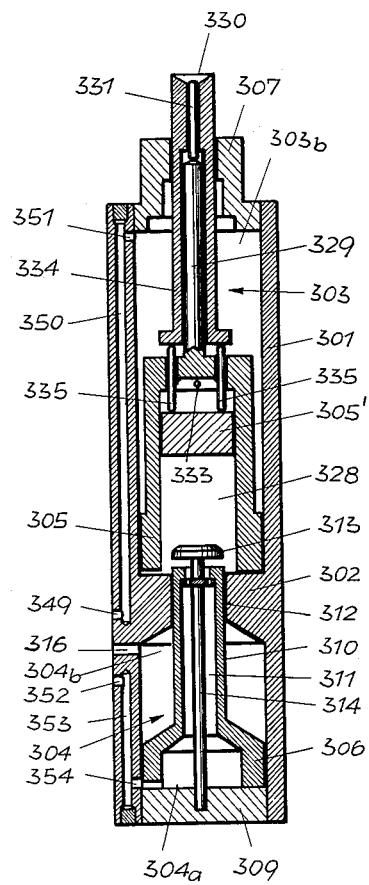

In the embodiment disclosed in FIG. 10 the conditions are different than those prevailing in the embodiment disclosed in FIG. 9. The embodiment disclosed in FIG. 10 comprises again a cylinder block 301 divided by a first dividing wall 302 and separating the chambers 303 and 304. A set-off piston 306 is reciprocating in the chamber 304 and a working ram 305 is reciprocating in the chamber 303. The chambers 303 and 304 are closed up by the covers 307 and 309, respectively. The cylinder block 301 has also the connection bores 349, 316 and 352 communicating with the conduits 350 and 353, respectively, which lead to the bores 351 and 354, respectively. The working ram 305 has a piston rod 329 and the set-off piston 306 has a hollow piston rod 310 defining a bore 311 therein and receiving the ram 314 for operation of the valve member 313. The working ram 305 forms a second dividing wall, however, the working ram part 305' has no piston rod, rather a sleeve 334 is provided in its place, which sleeve 334 surrounds the piston rod 329 of the working ram 305 and is also movable along the piston rod 329, the sleeve 334 being pushed by the working ram part 305' by means of the rams 335.

Referring now to FIG. 11, a further embodiment is disclosed which is further improved over the embodiments disclosed in FIGS. 1 to 10 by using entirely the stroke of the set-off piston. Since the changes which bring about this improvement are limited exclusively to the set-off piston and its chamber, respectively, they are shown in FIG. 11 at enlarged scale; thus this embodiment comprises again the cylinder block 401 defining the chamber 404 which is closed up by the cover 409 and a set-off piston 406 reciprocating in the chamber 404 and having a hollow piston rod 410 having a bore 411.

The connection bore 454 is not disposed at one end of the chamber 404 receiving the set-off piston 406, but is arranged in such manner that it is disposed adjacent an annular channel 436 provided in the periphery of the set-off piston 406 or in the inner wall of the cylinder block 401. The annular channel 436 is connected with the axially disposed bore 411 of the hollow piston rod 410 and of the set-off piston 406 by means of radial bores 437. In addition, the annular channel 436 is also connected with the chamber portion 404a by means of at least one small bore 438 which is disposed parallel to the longitudinal axis of the set-off piston 406, which chamber portion 404a is to be set under pressure during the advancing stroke of the set-off piston 406. A sliding ring 439 is secured advantageously on the set-off piston 406, which sliding ring 439 limits the annular channel 436 at one side and which carries one or more of said small bores 438.

A stopper 440 is screwed into the end face of the set-off piston 406 in which stopper 440 are disposed one or more relief valves, the latter comprising a ball 441 and a spring 442, and the spring 442 operating against the pressure prevailing in the chamber portion 404a. Furthermore, an annular groove 443 is provided in the cylinder block 401 adjacent the opening or bore 454, which annular groove 443 expands the annular channel 436, until the sliding ring 439, which is rigidly mounted on the set-off piston 406, returns during the return stroke of the set-off piston 406.

The embodiment disclosed in FIG. 11 operates in the following manner:

Upon feeding the pressure medium through the connection bore 454, the pressure medium enters at first the annular channel 436 and from there, following again the line of least resistance, through the radial bores 437 into the bore 411 of the set-off piston 406 and thus through the hollow piston rod 410 of the set-off piston 406 into the chamber of the working ram (not shown in FIG. 11) and thus causes the advancing stroke of the working ram. The pressure medium is, however, fed simultaneously, yet slowly through the small bore 438 into the chamber portion 404a and advances the set-off piston 406 in forward direction at a slow pace. When the rear edge of the sliding ring 439 reaches the annular groove 443, the set-off piston 406 receives the full impact of the pressure medium and is advanced now correspondingly at an accelerated pace. Thus a first impact phase results, in which the pressure medium is fed through the radial bores 437, which feed does not cause yet any movement of the set-off piston 406, to be followed by a second impact phase in which the set-off piston 406 is moved slowly by means of the pressure medium fed through the small bore 438 and to encounter a third impact phase in which the set-off piston 406 is subjected to the full pressure and is advanced at accelerated pace.

The pressure medium flows already during the first phase through the bore 411 of the piston rod 410 of the set-off piston 406 and raises the valve member (not shown in FIG. 11) which valve member is rigidly connected in this embodiment with the ram 414, the latter being axially movable and guided in the stopper 440 of the set-off piston 406, so that the pressure medium may penetrate already the chamber of the working ram. In order to limit the axial movement of the ram 414 in the direction towards the chamber of the working ram, the ram 414 is equipped with a disc 456 which has holes 457 through which the pressure medium may be fed.

In order to prevent a pressure build up in the chamber portion 404a during the return stroke of the set-off piston 406 upon passing of the annular groove 443 by the sliding ring 439, the relief valves 441 and 442 are provided which relieve the pressure medium present in the chamber portion 404a into the bore 411.

It is further possible to change the speed of admission of the set-off piston 406 by shifting a closing piston 444 which is adjustable in axial direction in the chamber portion 404a of the set-off piston 406 to be set under pressure during the advancing stroke of the set-off piston 406 and in particular the closing piston 444 is disposed between the set-off piston 406 and the closing cover 409. The closing piston 444 may be equipped with a piston rod 445 which projects through a bore of the cylinder cover 409 in order to permit of adjustment in axial direction of the closing piston 444 or securing thereof relative to the closing cover 409.

Figure 12:
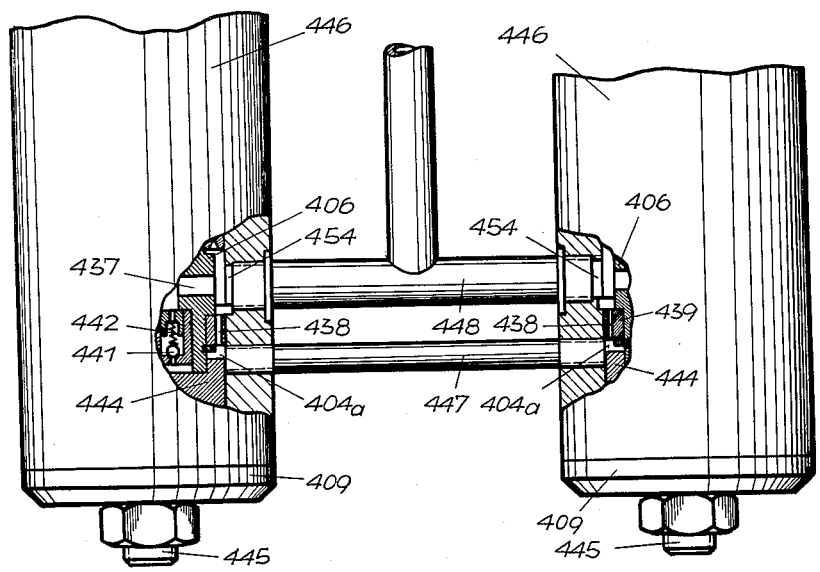
FIG. 12 is a fragmentary elevation of two hydraulic presses indicating the conduit connection thereof.

If a plurality of hydraulic presses is to operate as a unit in accordance with the present invention, all presses, as for instance shown in FIG. 12 for two presses 446, may be designed in such manner that they are hydraulically coupled among each other and in particular by connecting the chamber portions 404a of the set-off piston 406 of the presses 446 by means of a circuit conduit 447.

In this case all the other connections of the presses are likewise connected with each other advantageously as far as it is shown in FIG. 12 and the connection bores 454 are likewise connected by means of a circuit conduit 448.

It is of course also possible to eliminate the longitudinal bore of the piston rod 410 of the set-off piston 406 in the embodiment disclosed in FIG. 11 and to feed the pressure medium in the first phase from the annular chamber 436 through a channel (not shown) provided in the cylinder block 401 into the bore of the dividing wall to the front of the hollow piston rod 410.

FIGS. 13a and 13b disclose an embodiment which is particularly suitable to be used as a stamping tool. The design is chosen in such manner that workpiece parts which may remain on the piston rod of the working ram, may be stripped off by means of a sleeve, which piston rod is formed as a stamping tool during the return stroke of the tool. The set-off piston and the working ram are substantially designed as described above though new parts are added thereto.

The cylinder block comprises two separate parts 501 and 501a which are screwed together by a threaded connection 555. The first dividing wall 502 between the working ram 505 and the set-off piston 506 is arranged in such manner that the dividing wall 502 covers on the inside the slit created by the screwing together of the cylinder block parts 501 and 501a and it has a collar 502a which is clamped between the cylinder block parts 501 and 501a. The first dividing wall 502 divides the cylinder block into the chambers 503 and 504. The chamber 504 is closed at the end opposite the dividing wall 502 by the closing cover 509 and by means of a closing piston 544 which is axially adjustable by means of a screw 545 or the like, so that by adjustment of the closing piston 544 the volume of the chamber 504 may be changed.

The connection bore 554 for the pressure medium is disposed in such manner that it is arranged opposite an annular channel 536 provided in the periphery of the set-off piston 506. The annular channel 536 is connected with the bore 511 of the set-off piston 506 by means of radial bores 537, the bore 511 being disposed in axial direction. The annular channel 536 is also connected with the chamber portion 504a which is to be set under pressure during the advancing stroke of the set-off piston 506 by means of at least one small bore 538 disposed parallel to the longitudinal axis of the set-off piston 506. It is of advantage to secure a sliding ring 539 to the set-off piston 506, which sliding ring provides a limit for one side of the annular channel 536, which sliding ring 539 contains one or more of said small bores 538. A stopper 540 is screwed into the end face of the set-off piston 506 in which stopper 540 are arranged one or a plurality of relief valves in such manner that the springs 542 operating against the pressure prevailing in the chamber portion 504a press down balls 541 on axial bores of the stopper 540, the relief valves consisting of balls 541 and springs 542.

A valve ram 514 is arranged in the bore 511 of the hollow piston rod 510 of the set-off piston 506, as also shown in the embodiment of FIG. 11, in such manner that at one of the ends of the valve ram 514 is secured the valve member 513 which may close up the bore 511 of the hollow piston rod 510. In the example shown in FIG. 13b, the valve ram 514 has a half-circular profile for better guidance and for part relief of the bore 511. The disc 556 having axially disposed bores 557 is screwed inside of the set-off piston 506 on the valve ram 514, which disc 556 limits the path of the ram 514 in the direction towards the chamber 503 of the working ram. The other end of the ram 514 which is opposite the valve member 513, is axially movable in the stopper 540 and finds its abutment at the closing piston 544 in the open position of the valve member 513.

The set-off piston 506 operates in the same manner as the set-off piston 406 described in connection with FIG. 11.

In order to feed the pressure medium to bring about the return stroke of the set-off piston 506, an opening 516 is provided in the cylinder block 501, so that the pressure medium may enter into the chamber portion 504b. While the pressure medium enters into the chamber 503a through the bore 511 of the hollow piston rod 510 of the set-off piston 506 for the advancing stroke of the working ram 505, for the return stroke of the working ram 505 the pressure medium is released from the chamber portion 504b. In order to achieve this end, the collar 502a of the dividing wall 502 has longitudinal bores 502b which terminate in an annular groove 502c disposed on that side of the collar 502a which is opposite the cylindrical body 501a. The latter has a longitudinal bore 561 in its periphery, which bore 561 communicates at one end with the annular groove 502c and at its other end with the chamber 503.

The working ram 505 has a partly hollow piston rod 508 which is of appreciably greater length compared with the previously described embodiments. The piston rod 508 projects through a chamber 558 which is disposed in the cylindrical body portion 501a coaxially with the chambers 503a and 504 and which is separated from the chamber 503 receiving the working ram 505 by means of a second dividing wall 559. A third sleeve-like piston 560 is disposed in the chamber 558 on the piston rod 508.

The pressure medium is fed from the chamber 504a of the set-off piston 506 to the pressure side of the third sleeve-like piston 560 and, thereby, into the chamber portion 558a through the bore 511 of the hollow piston rod 510. The pressure medium enters the first bore 512 of the dividing wall 502 and reaches from here through radial bores 502d an annular channel 502e and from there through a bore 562 a longitudinal channel 563 of the cylindrical body part 501a which communicates with the chamber portion 558a receiving the third sleeve-like piston 560.

The chamber 558 for the third sleeve-like piston 560 is closed up by means of a third dividing wall 564 in the direction toward the workpiece. The third sleeve-like piston 560 is partly surrounded by a sleeve 565 outside of the chamber 558 from which the piston 560 projects. The sleeve 565 is guided in the cylindrical body part 501a and rigidly secured to the piston 560 by means of set screws 566 or the like. The piston rod 508 is guided in a bore 567 of the sleeve 565 at the end of the latter which is directed towards the workpiece.

The sleeve 565 is moved during the advancing stroke in such manner that it runs ahead with its end face 565a relative to the end face 508c of the piston rod 508, so that the sleeve 565 exerts pressure first upon the workpiece and then the piston rod catches up with the previously advanced sleeve 565 and operates the workpiece, as for instance, stamps the latter with its end face 508c which is formed as a stamping die. During the return stroke the piston rod 508 moves first until its end face 508c withdraws into the bore 567 of the sleeve 565. During this movement any workpiece parts remaining at the end face 508c of the piston rod 508 serving as a tool are stripped off by the end face 565a of the sleeve 565. Only after the end face 508c of the piston rod 508 withdraws into the bore 567 of the sleeve 565, the sleeve 565 joins the return stroke.

The succession of these movements is achieved in the following manner:

The piston rod 508 is equipped with a catch which is axially movable with the piston rod 508 in an expanded bore 568 of the sleeve 565. The length of this expanded bore 568 is of such measurement, that the piston rod 508 is not moved at the end of the advancing stroke and at the beginning of the return stroke, yet is moved at the end of the return stroke. The catch is formed in such manner that the piston rod 508 is subdivided into a portion 508a formed as a tool and another portion 508b. The portions 508a and 508b carry a collar 569 and 570, respectively, at their engaging ends. The two collars are held together by means of a sleeve 571 operating as a catch device which sits on the collars 569 and 570 and also on the adjacent parts of the piston rod parts 508a and 508b, which sleeve 571 is split in axial direction and is axially movable in the expanded bore 568.

The third sleeve-like piston 560 and the sleeve 565 operate in the following manner:

In the starting position shown in FIG. 13b the pressure medium is fed at first through the connection bore 554, the annular groove 536, the radial bores 537 and through the bore 511 of the hollow piston rod 510 of the set-off piston 506 into the bore 512 of the first dividing wall 502 and may be fed from there directly on the working ram 505 as well as through the radial bores 502d, the annular groove 502e of the second dividing wall 502, the channel 563 of the cylindrical body part 501a and the chamber 558a onto the third sleeve-like piston 560. Since the third piston 560 moving the sleeve 565 and the working ram 505 during their advance movement are subjected to the same pressure medium, a relative movement between the sleeve 565 and the working ram 505 is dependent upon the cross-section of the working ram 505 and of the third piston 560 and upon the friction conditions, the latter being related to the sealing means (not shown) of the pistons. As soon as one of the two elements, namely the sleeve 565 engages with its end face 565a the workpiece, for instance two metal sheets to be riveted together, or the piston rod 508 engages the workpiece with its end face 508c, the more advanced member will encounter resistance due to the engagement with the workpiece, so that the pressure medium will follow the path of lesser resistance and will advance the other member, until the latter is likewise in engagement with the workpiece. The second portion 558b of the chamber 558 contains air only, which may escape through one or a plurality of openings 572 during the advancing stroke of the piston 560. Immediately thereafter the piston rod 508 starts to advance relative to the sleeve 565 due to the cross section relations and after closing the bore 511 of the hollow piston rod 510 of the set-off piston 506 by means of the valve member 513, whereby the split sleeve 571 can advance in the annular chamber 568, which is filled likewise with air only and, for this reason, has at its ends one or a plurality of escape openings 573 and 574. Thus the tool performs its working stroke (FIG. 13c)

During the return stroke, the piston rod 508 only moves first, since no force is exerted yet upon the piston 560 and the sleeve 565. Only after the split sleeve 571 reaches the end of the expanded bore 568, the piston 560 and, thereby, also the sleeve 565 joins the return movement, so that then all parts return again to their original position shown in FIGS. 13a and 13b.

The embodiment shown in FIGS. 14a and 14b amounts to a variation, wherein the set-off piston disclosed in FIGS. 1 to 6, however, and the working ram part disclosed in FIGS. 13a and 13b are used.

The elements are designated by numerals identical with those applied to FIGS. 1 to 6 and FIGS. 13a and 13b, respectively, and the operation is the same as described in connection with the embodiment of FIGS. 13a and 13b.

FIGS. 15a and 15b show an embodiment wherein the set-off piston disclosed in FIGS. 13a and 13b and the working ram disclosed in FIG. 9 are used.

The elements in this embodiment are designated by numerals identical with those applied in FIGS. 13a and 13b and FIG. 9, respectively, and the operation is the same as described in connection with the embodiment of FIGS. 1 to 6.

While I have disclosed several embodiments of the present invention, it is to be understood that these embodiments are given by example only and not in a limiting sense, the scope of the present invention being determined by the objects and the claims.

I claim:

1. In a hydraulic press, a cylindrical hollow body, a dividing wall disposed perpendicularly to the longitudinal axis of said body intermediate the ends of the latter and a closing cover at one end of said body, said cylindrical hollow body defining one chamber on each side of said dividing wall, at least one coaxially disposed piston reciprocating in each of said chambers, one of said pistons operating as working ram in one of said chambers and another of said pistons operating as a set-off piston in the other of said chambers and having a portion of reduced diameter, said portion of reduced diameter of said set-off piston projecting into the chamber receiving said working ram, said dividing wall having a bore of a diameter complementary with the outer diameter of said portion of reduced diameter of said set-off piston, said cylindrical body including means for feeding pressure fluid to and releasing pressure fluid from, respectively, said axial chambers for operation of said pistons, and said set-off piston having an axial bore, a valve member disposed at and closing one end of said bore adjacent said working ram, and an operating ram disposed between said valve member and said closing cover closing said chamber receiving said set-off piston, said operating ram being adapted to lift said valve in one of the end positions of said set-off piston, said cylindrical body having an opening opposite said set-off piston when in its starting position, said opening constituting said means for feeding pressure fluid to and releasing pressure fluid from, respectively, said chambers, said set-off piston having an annular recess at its outer periphery, and said annular recess communicating with said opening of said cylindrical body in the starting position of said set-off piston, so that during the starting movement of said set-off piston said pressure fluid is fed into said annular recess, means for communicating said annular recess with said axial bore of said set-off piston, the latter having an additional bore of small diameter disposed parallel to the longitudinal axis of said set-off piston connecting said annular recess with the space of said other of said chambers below said set-off piston.

2. The hydraulic press, as set forth in claim 1, wherein said set-off piston has at its periphery a sliding ring which defines said annular recess at one side thereof, and said sliding ring has said small bore extending through said set-off piston.

3. The hydraulic press, as set forth in claim 1, wherein said set-off piston has a second recess at its end communicating with said axial bore on the pressure side during its advancing stroke, a stopper received in said second recess, and a relief valve mounted in said stopper.

4. The hydraulic press, as set forth in claim 1, wherein said working ram has a piston rod, and a sleeve-like third piston is axially movable on said piston rod, a second dividing wall disposed in said cylindrical body and surrounding said piston rod, said second dividing wall with said cylindrical body defining a third chamber in which said third piston reciprocates, means for connecting the pressure side of said third chamber with means for feeding pressure fluid to said working ram, and a sleeve member disposed in said cylindrical body outside of said third chamber receiving said third piston and axially movable on said piston rod, the latter having an end face formed as a stamping die, means for connecting said sleeve member with said third piston, and a catch device secured to said piston rod, said catch device sliding axially inside of said sleeve member and having means for coupling said third piston with said piston rod for a joint return stroke thereof, so that the end face of said piston rod runs at first behind the end face of said sleeve member during the advancing stroke thereof.

5. The hydraulic press, as set forth in claim 4, wherein said piston rod of said working ram is divided into a first and a second piston rod part, said first piston rod part projecting through said third piston and said second piston rod part being formed as said stamping die, both said piston rod parts having at their engaging ends a collar, a sleeve surrounding both said collars, constituting said catch device, and split in an axially disposed plane, said sleeve being axially movable in an annular chamber surrounding said piston rod.

6. The hydraulic press, as set forth in claim 4, wherein said cylindrical body comprises two body parts having complementary threads for screwing together said body parts and forming a slit therebetween, one of said body parts includes said chamber receiving said set-off piston, and the other of said body parts includes said chambers receiving said working ram and said third piston, and said dividing wall separating said chambers receiving said set-off piston and said working ram, respectively, covers the inside of said slit formed between said two body parts.

7. The hydraulic press, as set forth in claim 1, which includes at least one relief valve member disposed in said set-off piston between said axial bore of the latter and the pressure side of said set-off piston during its advancing stroke, said relief valve member being responsive to the pressure at said pressure side of said set-off piston for communication between said pressure side and said axial bore of said set-off piston, so that during the return stroke of said set-off piston said relief valve member permits escape of said pressure medium from that portion of said other of said chambers disposed opposite the pressure side of said set-off piston.

8. In a hydraulic press, a cylindrical hollow body, a dividing wall disposed perpendicularly to the longitudinal axis of said body intermediate the ends of the latter and a closing cover at one end of said body, said cylindrical hollow body defining one chamber on each side of said dividing wall, two coaxially disposed and successively operating pistons reciprocating in said respective chambers, one of said pistons operating as a working ram in one of said chambers and the other of said pistons operating as a set-off piston in the order of said chambers and having a portion of reduced diameter, said portion of reduced diameter of said set-off piston projecting into the chamber receiving said working ram, said dividing wall having a bore of a diameter complementary with the outer diameter of said portion of reduced diameter of said set-off piston, said set-off piston having an axial bore, a valve member disposed in said bore, an operating ram disposed between said valve member and said closing cover closing the chamber of said set-off piston, said operating ram being adapted to lift said valve member in one of the end positions of said set-off piston, said cylindrical hollow body having two openings in its surface, said openings being adapted to communicate at one of their ends alternatively with a pressure fluid source and a container for released pressure fluid, respectively, the other end of one of said openings communicating with said other of said chambers receiving said set-off piston at one end of said other of said chambers, the other end of the other of said openings communicating with the other end of said other of said chambers and with said axial bore of said set-off piston when in its starting position, means for advancing said set-off piston at the beginning of its forward stroke at a slow speed and at a greater speed upon reaching a predetermined point along the path of said stroke, means connected with the wall of said cylindrical body and communicating with said one of said openings connected with said pressure fluid source during the return stroke of said set-off piston and of said working ram to feed said pressure fluid to said other of said chambers receiving said set-off piston adjacent said dividing wall and said one of said chambers receiving said working ram remote from said dividing wall.

9. The hydraulic press, as set forth in claim 1, which includes means for subjecting said axial bore of said set-off piston to the full pressure of the pressure medium in a first operation phase.

10. The hydraulic press, as set forth in claim 2, which includes a closing piston disposed between said closing cover, and said set-off piston, and means for axial adjustment of said closing piston.

11. The hydraulic press, as set forth in claim 8, wherein said means for advancing said set-off piston at a slow speed comprises means for throttling the feed of said pressure fluid to the other of said chambers.

References Cited in the file of this patent

UNITED STATES PATENTS

| | | |
|---|---|---|
| 535,112 | Ketchum | Mar. 5, 1895 |
| 1,399,169 | Trace | Dec. 6, 1921 |
| 1,628,094 | Wigtel | May 27, 1927 |
| 2,357,632 | Cornelius | Sept. 5, 1944 |
| 2,452,292 | Cousino | Oct. 26, 1948 |